Figure 1:
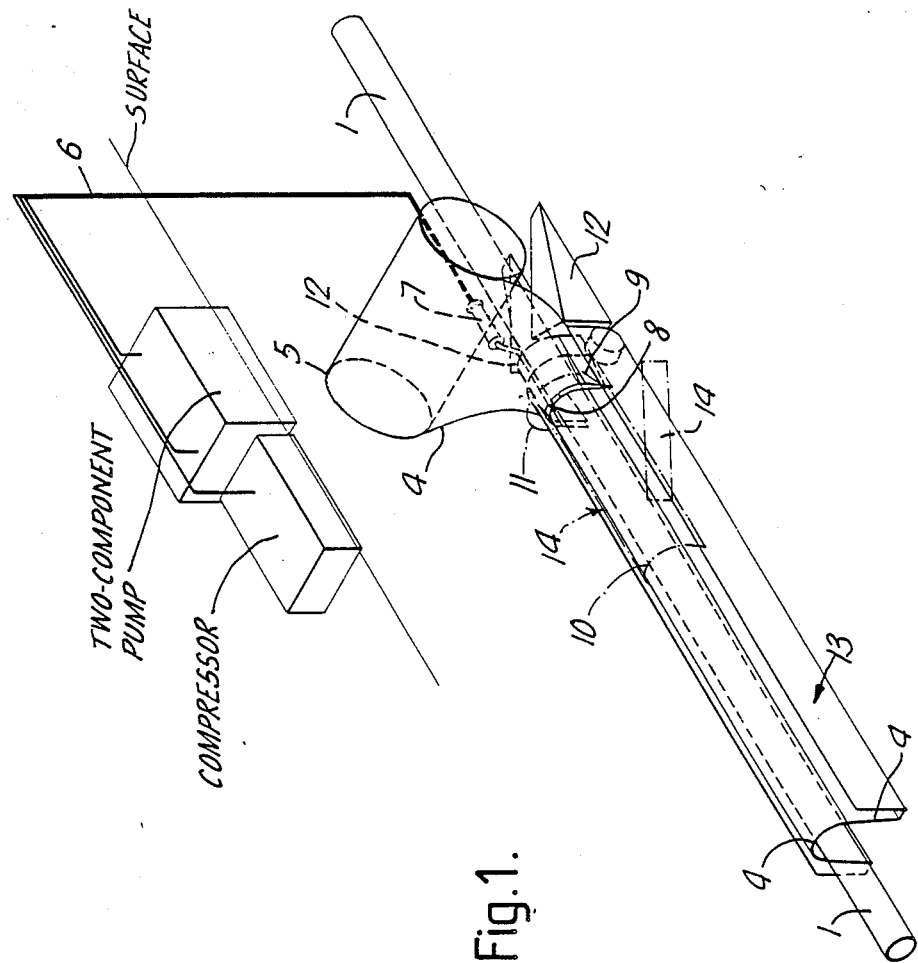

United States Patent [19]

Vilnes

[11] Patent Number: 4,913,588
[45] Date of Patent: Apr. 3, 1990

[54] METHOD AND MEANS FOR PROVIDING A THERMIC INSULATING EFFECT AROUND AN ARTICLE, SUCH AS A PIPELINE WHICH IS SUBMERGED IN WATER

[76] Inventor: Dag Vilnes, Kleivvein 16, N-3132 Husøysund, Norway

[21] Appl. No.: 295,609

[22] PCT Filed: Apr. 28, 1988

[86] PCT No.: PCT/NO88/00033
§ 371 Date: Dec. 29, 1999
§ 102(e) Date: Dec. 29, 1988

[87] PCT Pub. No.: WO88/08500
PCT Pub. Date: Nov. 3, 1988

[30] Foreign Application Priority Data

Apr. 29, 1987 [NO] Norway .................................. 871795

[51] Int. Cl.$^4$ ..................... F16L 57/00; F16L 59/14; F16L 1/04
[52] U.S. Cl. .................................... 405/157; 405/172; 264/45.8; 264/45.9; 264/46.9; 264/262
[58] Field of Search ..................... 405/172, 155–157; 264/45.8, 45.9, 46.9, 51, 173, 204.3, 262; 425/103, 329

[56] References Cited

U.S. PATENT DOCUMENTS

| | | |
|---|---|---|
| 3,733,382 | 5/1973 | Van Dijk . |
| 4,134,782 | 1/1979 | Straughan ...................... 264/45.8 X |
| 4,240,850 | 12/1980 | Arntz ............................. 264/45.8 X |
| 4,289,716 | 9/1981 | Voigt . |
| 4,338,043 | 7/1982 | Biancale et al. ..................... 405/172 |
| 4,411,949 | 10/1983 | Snider et al. .................... 264/45.8 X |
| 4,480,943 | 11/1984 | Leuenberger ....................... 405/172 |
| 4,537,913 | 8/1985 | Baumann ............................ 521/107 |

OTHER PUBLICATIONS

Derwent's Abstract No. D 8014 D/17, SU 754 158.

Primary Examiner—Randolph A. Reese
Assistant Examiner—John Ricci
Attorney, Agent, or Firm—Cushman, Darby & Cushman

[57] ABSTRACT

A method and apparatus for insulating a pipeline (1) which is more or less submerged in the sea bottom consists in that the insulation (3) is made directly at the pipeline (1): the substances for production of the insulating overing are transported to a mixing chamber (7) at the production site and are foamed around the pipeline (1). For this purpose may be used a flexible sheet (4) of material such as foil which is anchored to the sea bottom (2). Through the production of the insulation (3) in situ, the gas pressure in the insulating material (3) can be adapted to the outer pressure and thereby a compression of the material with loss of insulating effect can be avoided.

7 Claims, 2 Drawing Sheets

METHOD AND MEANS FOR PROVIDING A THERMIC INSULATING EFFECT AROUND AN ARTICLE, SUCH AS A PIPELINE WHICH IS SUBMERGED IN WATER

The invention relates to a method for providing a thermic insulating effect around an article, such as pipe line which is submerged in water, by the use of a foam based insulating substance. The invention also relates to means for use in providing such a thermic insulating covering over an article.

Especially, the invention is intended for use in connection with pipe lines for transport of liquids and gases, such as hydrocarbon products from submerged wells positioned on the sea bottom in very deep water.

During transport of hydrocarbons in production pipe lines, there will take place a considerable cooling when will cause a reduction of the pressure and increased viscosity with resulting demand for pumping capacity and separating capacity. It is therefore wanted to insulate such pipe lines. A problem in this connection will however be that the outer pressure in deep water will be very high and that the insulating material will be exerted for an outer pressure which will reduce the gas volume in the insulating material and thereby also the insulating properties of the material.

The object of the present invention is to avoid this problem. This object is achieved by a method as described in the patent claims.

The invention also relates to means for use in the production of thermic insulating coverings in deep water, i.e. by high outer pressure. A means for such use is characterized by the features given in the means claims.

The present invention is based on the principle that the separate components which are necessary to produce the insulating material are brought separately down to the article which shall be insulated and that the material, for instance a cellular plastic material is produced in situ on or near the article or with other words at the place in which the production takes place and at the same pressure at which it shall be used. The components necessary for producing a cellular plastic material in the form of foam are a gas with a pressure adapted to the outer pressure and solid substances such as a adhesives and foaming liquid.

The inventor has by tests prooved that it is possible to produce cellular plastic material under water and thereby achieve a product with good properties for the intended purpose. Thus, a cellular plastic material based on amino-plastic, such as urea-formaldehyde, has been produced under water by forming of an aqueous emulsion with air by the use of conventional, acid forming agents and hardener. The cellular plastic material which was achieved was consolidated to a large unitary body with good insulating and adhesive properties and with sufficient mechanical strength.

Figure 2:
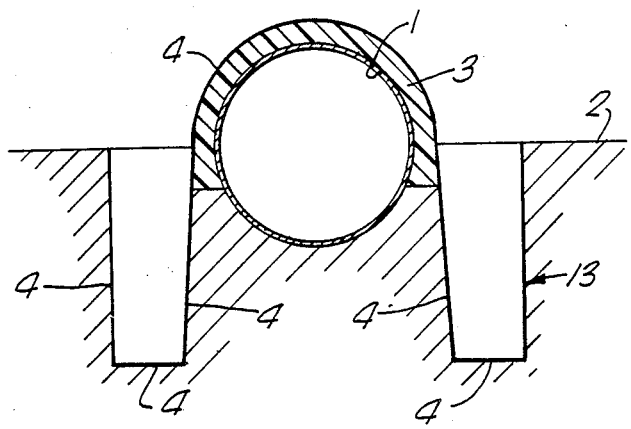
Figure 3:
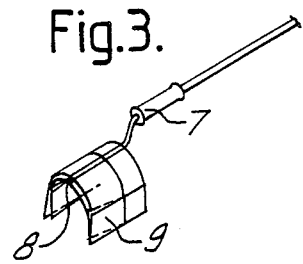
Figure 4:
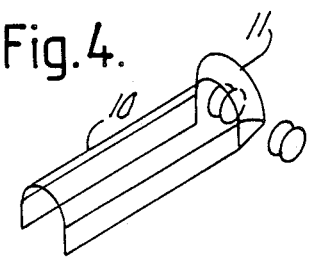

The invention will in the following be further illustrated by means of a possible embodiment which schematicly has been shown on the drawing. The figures are showing:

FIG. 1 an isometric view illustrating a means according to the invention for providing an insulating covering on the pipe line by the use of the method according to the invention, and FIG. 2 a cross-section of an insulated pipe, and FIG. 3 a detailed view of the foam producer and nozzle arrangement, and FIG. 4 a detailed view of the form element.

In the drawing it is shown an embodiment of the invention, used for insulating a pipe line 1 positioned at the sea bottom 2, partly submerged into the sea bottom. In order to insulate this pipe line 1 a covering of insulating foam 3 shall be produced around that part of the pipe line which is positioned over the sea bottom 2. This foam is produced in the space between the pipe line 1 and a cap in the form of a flexible sheet material, which is sound off from a supply roll 5. The foam producing substances are led to a foam producing or mixing chamber 7 through a supply and conduit system which generally has been referred to by 6 and which is of known art. The agents which are transported to the foam producing chamber 7 may be air from a compresser and appropriate substances led in separate conduits and pumped for instance with a two-component pump. These substances are mixed in the mixing chamber 7 and led out between the foil 4 and the pipe line 1 through an injection nozzle 8.

In order to protect the foam material the foil which acts as a form may be anchored into the sea bottom as illustrated on FIG. 2. Trench ploughs are moved along the pipe line, one on each side and are digging a recess in which the side edges of the foil may be placed. Thereby the side edges are folded as illustrated by 13. After having placed the foil in the trenches a back-fill plough 14 are replacing the material which has been ploughed away and thereby anchoring the foil. Another possibility would be not to use ploughs but instead position some type of weight material on the side edges of the foil.

In order to regulate the thickness of the insulating layer, the first part of the foil behind the injection site may be covered by a form element 10 of a rigid material. In order to assist in bringing the foil material 4 to the pipe line this form may have a flared part 11 at the front. In order to avoid foam from being pushed in a wrong direction it may be placed a tightening flap or element 9 in the area at the flared part 11 of the form element. The production of the insulating covering is made continuously by moving the production means along the pipe line. The devices for moving has not been shown and neither has the rack elements for fixing the different elements of the means. The construction of such elements will be self-evident for the man skilled in the art and has therefore not been shown. Such elements can be positioned on the drive wells of a robot device or the like.

I claim:

1. A method for providing thermal insulation for a submerged pipe disposed on the sea floor with a foam insulating material comprising the steps of:
   (a) drawing off from a supply sheet material having opposite side edges,
   (b) shaping the sheet material about at least a portion of the pipe to provide a form including an area for receiving the foam insulating material,
   (c) anchoring said side edges by applying weight thereto to substantially prevent movement of the sheet material relative to the pipe, and
   (d) injecting the foam insulating material into said area between the pipe and the form as the pipe is covered by the sheet material.

2. A method according to claim 1, characterized in that a cellular plastic material is produced in situ around the article.

3. A method according to claim 2, characterized in that the cellular plastic material is produced by use of an aminoplastic, such as urea-formaledhyde and a gas and/or liquid, such as air or water.

4. A method according to claim 3, characterized in that the aminoplastic as an aquous emulsion is led down to the article and is foamed there by the use of gas or liquid, the emulsion and the gas/liquid being transported through separate conduits and the necessary, known additives for stabilizing the cellular plastic being added through a further separate conduit.

5. A method according to claim 1, characterized in that the production of the foam material is made continuously by moving the production site along the article, preferably in length direction of the article.

6. An apparatus for providing thermal insulation for a submerged pipe disposed on the sea floor with a foam insulating material, the apparatus comprising means for supplying flexible sheet material for covering the pipe, forming means disposed to travel over the sheet material and the pipe, means for supplying foaming material to an area between the pipe and the sheet material while the sheet material is adjacent said forming means, plough means for providing troughs in the sear floor along and on bot sides of the pipe for receivign portions of the sheet material.

7. Apparatus according to claim 6, characterized in that the forming means has been provided with a flared position at its forward end.

* * * * *